United States Patent [19]

Shimizu

[11] Patent Number: 5,610,804
[45] Date of Patent: Mar. 11, 1997

[54] POWER SUPPLY WITH DUAL ENERGY TRANSFER CIRCUITS FOR POWER FACTOR CORRECTION

[75] Inventor: Katsuhiko Shimizu, Sakura, Japan

[73] Assignee: TDK Corporation, Tokyo, Japan

[21] Appl. No.: 491,078

[22] Filed: Jun. 19, 1995

[30] Foreign Application Priority Data

Jun. 20, 1994 [JP] Japan .................................. 6-137383

[51] Int. Cl.[6] .................................................. H02M 3/335
[52] U.S. Cl. ............................. 363/21; 363/97; 363/131
[58] Field of Search ................................ 363/18, 19, 20, 363/21, 97, 131

[56] References Cited

U.S. PATENT DOCUMENTS

| | | | |
|---|---|---|---|
| 4,549,254 | 10/1985 | Kissel | 363/21 |
| 4,607,319 | 8/1986 | Assow et al. | 363/20 |
| 4,617,620 | 10/1986 | Speranza | 363/19 |
| 4,652,984 | 3/1987 | van der Akker et al. | 363/21 |
| 4,684,871 | 8/1987 | Plagge | 363/19 |
| 4,731,719 | 3/1988 | Nelson | 363/20 |
| 4,965,506 | 10/1990 | Algra et al. | 363/19 |
| 5,442,536 | 8/1995 | Zimmermann | 363/21 |

FOREIGN PATENT DOCUMENTS 2-307365  12/1990  Japan .

Primary Examiner—Jeffrey L. Sterrett
Attorney, Agent, or Firm—Oblon, Spivak, McClelland, Maier & Neustadt, P.C.

[57] ABSTRACT

A first energy transfer circuit transfers the energy that stores in the transformer while the first switching element is ON, to the output side through an output winding of the transformer during the subsequent OFF period. A second switching element and the output winding of the second energy transfer circuit are connected in a circuit loop that runs through an input terminal, an output terminal, the load, the other output terminal and the other input terminal and transfers energy from the input side to the output side via the output winding when the second switching element is ON. The control circuit controls the ON period and the ON timing of the first switching element and the second switching element. A stable output voltage relative to a wide range of input voltages is obtained and, at the same time, a power factor correction is achieved.

13 Claims, 10 Drawing Sheets

POWER SUPPLY WITH DUAL ENERGY TRANSFER CIRCUITS FOR POWER FACTOR CORRECTION

BACKGROUND OF THE INVENTION

1. Field of the Invention

The present invention relates to a power supply unit. The power supply unit according to the present invention is used as a power supply input circuit to be connected to the front stage of a switching power supply or used as a switching power supply.

2. Discussion of Background

Power supply units of this type in the known art are represented by the boost type and the buck-boost type. A typical boost type power supply unit is provided with a basic circuit structure that includes a rectifying circuit and a smoothing capacitor with a choke coil connected between them. A switching element is connected between power lines that are on a rear stage of the choke coil and a diode is connected in series with a power supply line that is on a rear stage of the switching element. Furthermore, an output capacitor is connected between the power lines on the rear stage of the diode and both ends of the output capacitor are led to an output terminal. In this circuit structure, the output capacitor is charged in one direction with the energy supplied by the power source and the energy stored in the choke coil while the switching element is ON via the diode to generate boosted voltages at both ends of the output capacitor.

A typical example of the buck-boost type power supply unit is a flyback converter system in which a switching element is connected in series with the input winding of the transformer for conversion and the energy stored in the transformer for conversion while the switching element is ON is transferred to the load side during the next OFF period.

Japanese Unexamined Patent Publication (KOKAI)No. 307365/1990 discloses an example of the buck-boost type power supply unit. The power supply unit disclosed in Japanese Unexamined Patent Publication (KOKAI) No. 307365/1990 is provided with a full wave rectifying circuit and a capacitor that is connected between the rectified output terminals of the rectifying circuit, with another switching element provided between the rectifying circuit and the inductor so that the two switching elements are turned ON and OFF at approximately the same time to obtain either a boosted or a stepped-down output voltage. However, the power supply units in the known art described above present the following problems.

First, in a boost type power supply unit, there is only a switching element connected between the power lines and there is no switching element to be connected in series to the power lines. Because of this, when the switching element has stopped its switching operation and is in an OFF state, the input voltage is output through the lines without regulation. Furthermore, if the output terminals are shorted or overloaded, protection against over current cannot be implemented. In addition, when the input voltage is applied, a rush current runs to the smoothing capacitor, and it may cause electrical damage to the rectifying circuit.

Another problem is that, since the output voltage is always higher than the input voltage, a DC-DC converter with high allowable input voltage is required on the rear stage. As for a buck-boost type power supply unit, since it is provided with a transformer for conversion which isolates the input terminals from the output terminals, unlike a boost type power supply unit, it does not present problems caused by the absence of a switching element connected in series to the power supply line. However, in this case, the entire energy must be transferred via the transformer for conversion. This, in turn, leads to lowered efficiency in energy conversion and a larger circuit.

The power supply unit disclosed in Japanese Unexamined Patent Publication (KOKAI) No. 307365/1990 requires that complicated ON/OFF control be performed for its two switching elements, making control difficult. Also, since the two switching elements and the two diodes are connected to the choke coil in series, the power loss is great when energy is stored in the choke coil and when the stored energy in the choke coil is discharged. This reduces the efficiency.

SUMMARY OF THE INVENTION

It is an object of the present invention to provide a power supply unit in which the power factor is corrected.

It is a further object of the present invention to provide a power supply unit in which a rush current is suppressed without resulting in a reduction in efficiency.

It is a still further object of the present invention to provide a power supply unit in which a stable, constant output voltage is achieved relative to input voltages over a wide range.

It is a still further object of the present invention to provide a power supply unit in which protection against excess current is achieved when the output is shorted.

It is a still further object of the present invention to provide a power supply unit in which the burden on the transformer for conversion is reduced to improve the efficiency in conversion.

It is a still further object of the present invention to provide a power supply unit in which the number of circuit elements included in the series connections is reduced so that the efficiency is improved through reduced loss.

It is a still further object of the present invention to provide a power supply unit which does not require a special choke coil so that the number of parts is reduced, contributing to miniaturization and cost reduction.

In order to achieve the objects described above, the power supply unit according to the present invention includes a first energy transfer circuit, a second energy transfer circuit and a control circuit, whereby electric power is transferred from input terminals to output terminals.

The first energy transfer circuit includes a transformer and a first switching element, which is connected in series to the input winding of the transformer to constitute a circuit in which energy that is stored in the transformer while the first switching element is ON is transferred to an output terminal via the output winding of the transformer during the subsequent OFF period. This means that the power supply unit according to the present invention includes a circuit operation that functions as a flyback system, buck-boost type power supply unit, as described earlier.

The second energy transfer circuit includes a second switching element and the output winding of the transformer. The second switching element and the output winding are connected within a circuit loop that leads from one of the input terminals through one of the output terminals to the load and then to the other of the output terminals before returning to the other of the input terminals, so that, when the second switching element is ON, a circuit is constituted in which energy is transferred from an input terminal to an output terminal via the output winding. Consequently, the energy supplied from the power source is transferred to the output terminals and, at the same time, the energy that is stored in the transformer while the first switching element is ON is sent to the output terminals during the subsequent OFF period. In this case, the output winding of the transformer also functions as a choke coil. As a result, a special choke coil is not required, achieving a reduction in the number of parts, which contributes to miniaturization and cost reduction.

The control circuit controls the timing with which the first switching element and the second switching element are turned ON and the length of time that they remain ON. Through this control operation, appropriate control to meet various needs such as stabilizing the output voltage and improving the power factor is performed. For instance, in order to control the output voltage at a constant level, the output voltage is monitored and the duty cycle of the first switching element and the second switching element are controlled so that the output voltage is constant. With this, a stable, constant output voltage is obtained, regardless of whether the input voltage is higher or lower than the target output voltage, or when they are equal. Thus, the output voltage is adjusted to a constant value relative to a wide range of input voltages.

Also, by controlling the timing with which the first switching element and the second switching element are turned ON and the time they remain ON, energy transfer from the input side to the output side is performed without interruption, as long as there is a voltage being input. This means that by supplying a continuous input voltage, such as a full wave rectified output, an input current is supplied continuously and this, in turn, will form a basis for an improvement in the power factor.

Furthermore, when transferring energy from the input terminals to the output terminals, it is not necessary to transfer the entirety of the energy via the electromagnetic coupling of the input winding and the output winding of the transformer, and this reduces the burden on the transformer, improving the conversion efficiency.

In addition, if the output terminals are shorted or overloaded, the energy to be transferred is reduced or cut off by lowering the duty cycle of the first switching element and the second switching element, or turning them OFF, achieving protection against over current at the time of output shorting.

Moreover, since the output current is limited by lowering the duty cycle of the first switching element and the second switching element, a rush current running to the smoothing capacitor is suppressed without adding a new circuit.

Also, since the first switching element and the second switching element lie in parallel viewed from the input terminals, even when the first switching element and the second switching element are turned ON at the same time, the electric current is divided when the energy is transferred, reducing power loss caused by the switching elements.

As a specific example of a circuit suited for correcting the power factor, the control circuit uses the detected signal of the output voltage between the output terminals and the detected signal of the electric current running to the first switching element as input signals, shifts the phase of the detected output voltage signal by approximately 90°, uses the signal after the shift as a command value to compare it with the detected electric current signal and controls the first switching element based upon the compared output signal.

BRIEF DESCRIPTION OF THE DRAWINGS

These and other advantages, features and objects of the present invention will be understood by those of ordinary skill in the art referring to the annexed drawings, given purely by way of non-limitative example, in which.

DETAILED DESCRIPTION OF THE PREFERRED EMBODIMENTS

Figure 1:
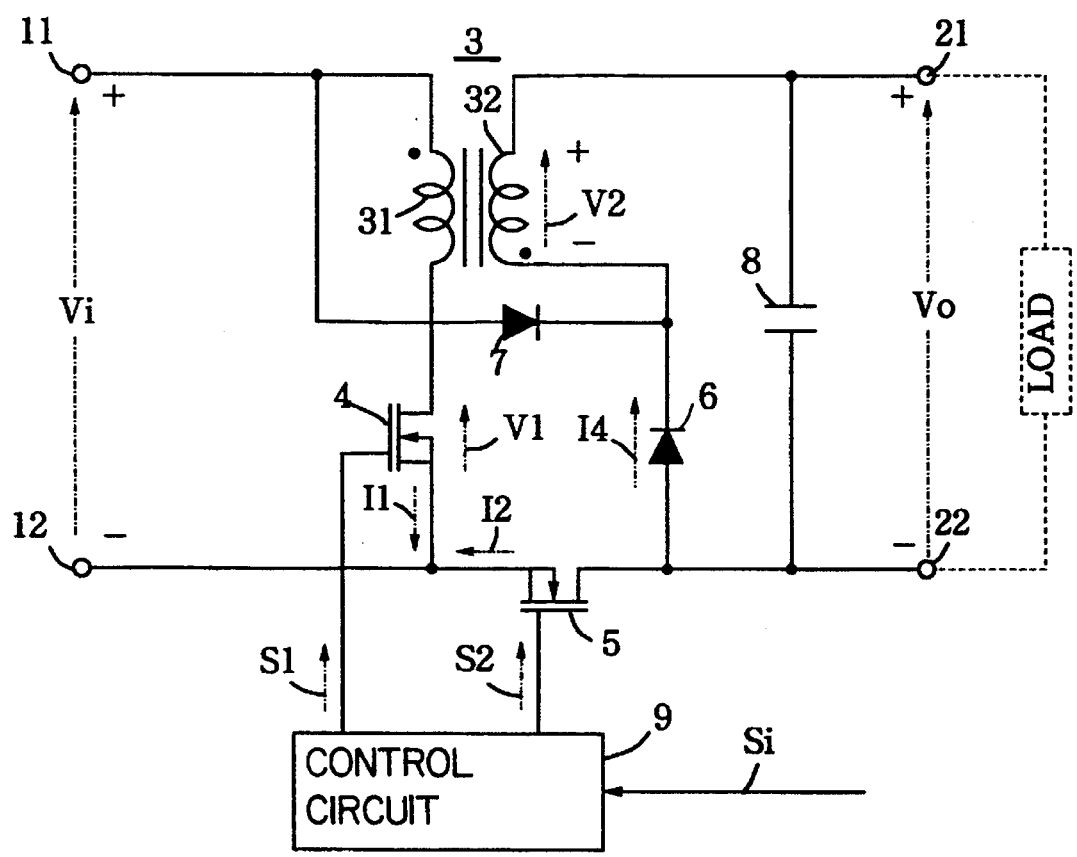
FIG. 1 is a circuit diagram of the power supply unit according to the present invention.

Referring to FIG. 1, the power supply unit according to the present invention includes input terminals 11 and 12, output terminals 21 and 22, a transformer 3, a first switching element 4, a second switching element 5, a first diode 6, a second diode 7, a capacitor 8 and a control circuit 9. A rectified voltage or a DC voltage is supplied to the input terminals 11 and 12 and a load is connected to the output terminals 21 and 22.

A first energy transfer circuit is constituted by the transformer 3, the first switching element 4, the first diode 6 and the capacitor 8. The transformer 3 is provided with an input winding 31 and an output winding 32. The black dots indicate the front end of the windings. The first switching element 4 is constituted of a three-terminal element such as a FET, a bi-polar transistor, a thyristor, a TRIAC or an IGBT, or another type of semiconductor element provided with control electrodes. Its main electrode circuit is connected in series to the input winding 31 and the circuit thus connected in series is then connected to the input terminals 11 and 12 to switch the electric current running through the series circuit. The first diode 6 is connected in series to the output winding 32 and this series circuit is connected to the output terminals 21 and 22. The polarity of the first diode 6 is directed so that it runs in the forward direction relative to the voltage generated at the output winding 32 when the first switching element 4 is OFF (flyback voltage). The flyback voltage V2 with the polarity shown in the figure is generated at the output winding 32 when the first switching element 4 is OFF. The first diode 6 runs in the forward direction relative to the flyback voltage V2.

A second energy transfer circuit is constituted by the second diode 7, the output winding 32 of the transformer 3, the second switching element 5 and the capacitor 8. The cathode of the second diode 7 is connected with the cathode of the first diode 6. The second switching element 5 is a 3-terminal element such as a FET, and its main electrode circuit constitutes a series circuit along with the output winding 32, the second diode 7 and the capacitor 8, viewed from the side with the input terminals 11 and 12. In this embodiment, the anode of the second diode 7 is connected to the input terminal 11 while its cathode is connected to the output winding 32 and the cathode of the first diode 6. The anode of the first diode 6 is connected to the output terminal 22. The second switching element 5 is connected between the input terminal 12 and the output terminal 22. The capacitor 8 is connected in parallel to the output terminals 21 and 22. The first diode 6, the capacitor 8 and the output winding 32 constitute an energy discharge circuit in which the energy stored in the transformer 3 is discharged through the energy transfer processes performed at the first energy transfer circuit and the second energy transfer circuit. The control circuit 9 controls the timing with which the first switching element 4 and the second switching element 5 are turned ON and the time they remain ON. This makes it possible to stabilize the output voltage and to correct the power factor. For instance, in order to make the output voltage Vo constant, a first control signal S1, which has an ON-time width that corresponds to the deviation of the output voltage Vo from the target output voltage Vr under the input condition Si set for the output voltage Vo at the output terminals 21 and 22, is supplied to the first switching element 4. The control circuit 9 supplies a second control signal S2 to the second switching element 5 so that the second switching element 5 may be turned ON while the first control signal S1 is OFF. The second switching element 5 may be turned ON while the first switching element 4 is ON and it may also be turned ON when the first switching element 4 is turned OFF. In short, the first switching element 4 and the second switching element 5 should simply perform ON/OFF operations that correspond to the control mode.

By controlling the ON period and the ON timing for the first switching element 4 and the second element 5, energy transfer from the input side to the output side is performed continuously, as long as there is an input voltage. This, in turn, makes it possible to supply an input current continuously by supplying a continuous input voltage such as a full wave rectified output, and this provides a basis for a correction in the power factor.

Figure 2:
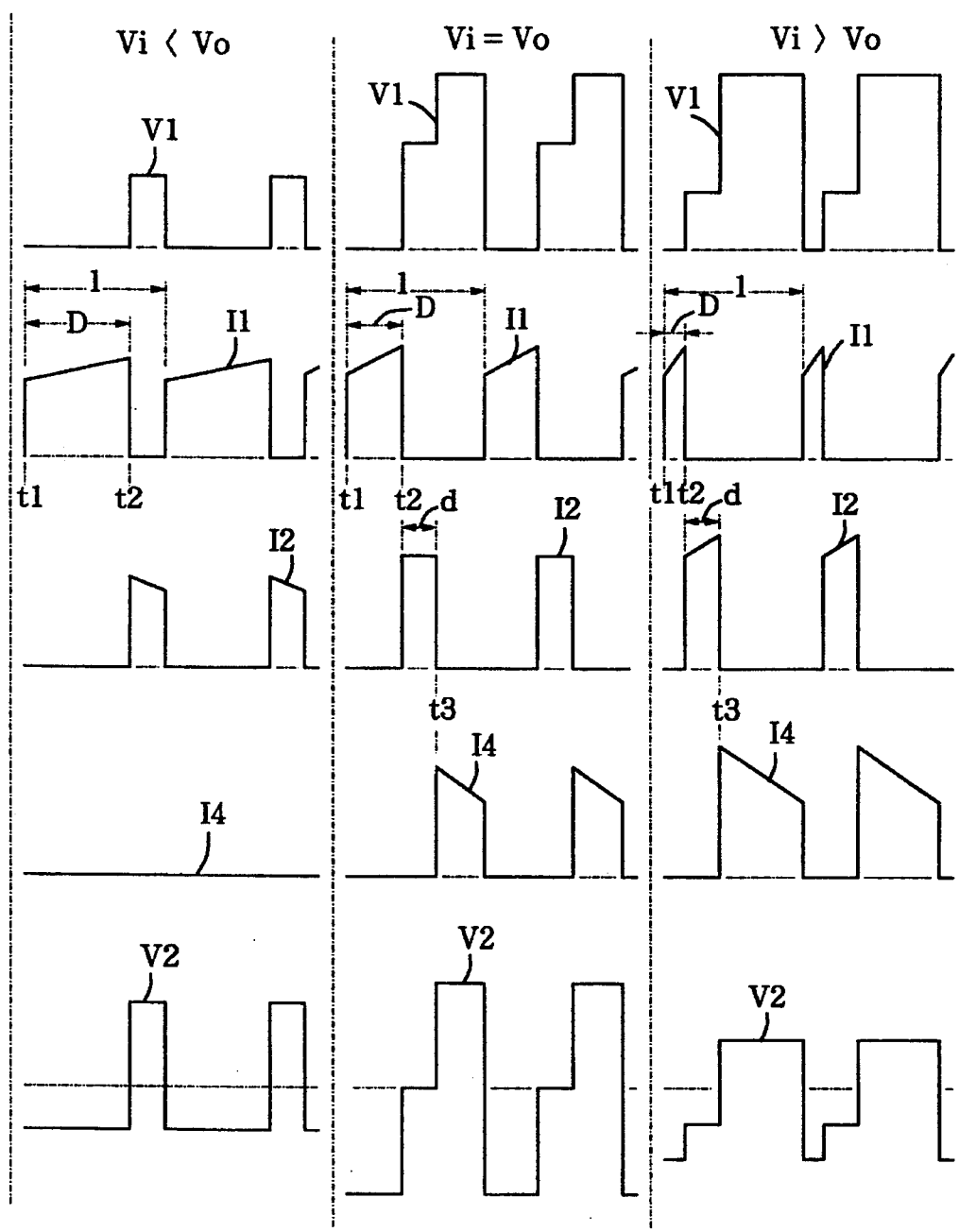
FIG. 2 is a timing chart illustrating the operation of the power supply unit according to the present invention.

Next, a specific example of the operation of the power supply unit according to the present invention is explained in reference to the timing charts in FIG. 2.

FIG. 2 shows a case in which the input voltage Vi is lower than the output voltage Vo, a case in which the input voltage Vi is equal to the output voltage Vo and a case in which the input voltage Vi is higher than the output voltage Vo. The reference number I1 indicates the current running through the first switching element 4, the reference number V1 indicates the terminal voltage of the first switching element 4, the reference number I2 indicates the current running through the second switching element 5 and the reference number I4 indicates the current running through the first diode 6. The functioning of the power supply unit according to the present invention shown in FIG. 1 is explained in reference to FIG. 2. Individual explanation is given for the following cases:

when the relationship between the input voltage Vi supplied to the input terminals 11 and 12 and the output voltage Vo which should be obtained at the output terminals 21 and 22 is Vi<Vo, when the relationship is Vi>Vo and when the relationship is Vi=Vo.

a. When Vi<Vo;

The operation of the first energy transfer circuit is performed in the following manner; first, at time point t1, the first switching element 4 is turned ON and the electric current I1 runs. The energy that corresponds to the current I1 is stored in the transformer 3. At this point, a voltage is generated in the output winding 32, whose positive polarity is toward the side with the black dot. Since the first diode 6 lies in the reverse direction relative to the voltage generated in the output winding 32, the electric current I4 does not run. Since the second diode 7 also lies in the reverse direction relative to the voltage generated in the output winding 32, reverse current running from the output terminals 21 and 22 to the input terminals 11 and 12 is prevented.

Next, at the time point t2, the first switching element 4 is turned OFF and the second switching element 5 is turned ON. When the first switching element 4 is turned OFF, the flyback voltage (V) whose negative polarity is toward the side with the black dot is generated in the output winding 32 in correspondence to the energy stored while the first switching element 4 was in the state of ON cycle.

Now, the operation in the second energy transfer circuit is explained. When the first switching element 4 is turned OFF and the second switching element is turned ON at the time point t2, a circuit loop is constituted with the input terminal 11→the second diode 7→the output winding 32→the output terminal 21→the load→the output terminal 22→the second switching element 5→the input terminal 12 and the electric current I2 runs through the circuit loop described above. With this, the capacitor 8 is charged up to the voltage that is the sum of the input voltage Vi and the flyback voltage V2 and the corresponding output voltage Vo appears at the output terminals 21 and 22. When the ratio of the number of windings between the input winding and the output winding in the transformer 3 is set as (n) and the duty cycle of the first switching element 4 is set as (D), the output voltage Vo is expressed as;

$$Vo = Vi + n \cdot Vi \ D/(1-D)$$

As the expression above clearly shows, a constant output voltage is obtained by controlling the duty cycle ratio (D) of the first switching element 4. Since the sum of the input voltage and the flyback voltage constitutes the output voltage, it is not necessary to perform the entire energy transfer from the input side to the output side through electromagnetic coupling of the input winding 31 and the output winding 32 of the transformer 3, which in turn, reduces the burden on the transformer and improves the efficiency of conversion. In addition, the transformer can be miniaturized.

Moreover, in this case, the ON period of the first switching element 4 is long and the operation of the first switching element 4 enters the next cycle while the second switching element 5 is ON. Because of this, the electric current I4 does not run.

b. When Vi>Vo;

Since the operation of the first energy transfer circuit is identical to that described earlier, it is mainly the circuit operation of the second energy transfer circuit that will be explained here. When the first switching element 4 is turned OFF and the second switching element is turned ON at the time point t2, a circuit loop is constituted with the input terminal 11→the second diode 7→the output winding 32→the output terminal 21→the load→the output terminal 22→the second switching element 5→the input terminal 12 and the electric current I2 runs through the circuit loop described above. In the transformer 3, the energy that was stored while the first switching element 4 was ON and also the energy that corresponds to the difference between the input voltage Vi and the output voltage Vo while the second switching element 5 is ON are stored.

When the second switching element 5 is turned OFF at the time point t3, the energy stored in the transformer 3 is discharged toward the load side via the first diode 6 and the output terminals 21 and 22, and the electric current I4 runs through the first diode 6.

When the ratio of the number of windings between the input winding and the output winding in the transformer 3 is set as (n) and the duty cycle of the first switching element 4 is set as (D), and the duty cycle of the second switching element 5 is set as d, the output voltage Vo obtained in this case is expressed as;

$$Vo=Vi\ (nD+d)/(1-D)$$

Thus, a constant output voltage is obtained by controlling the duty cycle ratios of the first switching element 4 and the second switching element 5. Since, in this case, too, it is not necessary to transfer all of the energy from the input terminals to the output terminals via electromagnetic coupling of the input winding 31 and the output winding 32 of the transformer 3, the burden on the transformer 3 is reduced and the efficiency of conversion is improved.

c. When Vi=Vo;

The operation in the first energy transfer circuit is identical to that described earlier. When the first switching element 4 is turned OFF at the time point t2, the flyback voltage V2 is generated by the energy stored while the first switching element 4 was in the state of ON cycle. When the second switching element is turned ON in this state, at the time point t2, a circuit loop is constituted with the input terminal 11→the second diode 7→the output winding 32→the output terminal 21→the load→the output terminal 22→the second switching element 5→the input terminal 12 and the electric current I2 runs through the circuit loop described above. The electric current I2 becomes a load current and the capacitor 8 is charged with the input voltage Vin.

When the second switching element 5 is turned OFF at the time point t3, the energy stored in the transformer 3 is discharged via the first diode 6 and the electric current I4 runs through the first diode 6.

When the ratio of the number of windings between the input winding and the output winding in the transformer 3 is set as (n) and the duty cycle of the first switching element 4 is set as (D), and the duty cycle of the second switching element 5 is set as (d), the output voltage Vo obtained in this case is expressed as;

$$Vo=n\cdot Vi\cdot D/(1-D-d)$$

As is clear from the explanation given above, a constant output voltage is obtained by controlling the duty cycle ratios of the first switching element 4 and the second switching element 5 regardless of whether the input voltage Vi is higher or lower than the output voltage Vo. Thus, a power supply unit with which the output voltage Vo is adjusted to a constant level relative to a wide range of input voltages Vi is achieved.

Also, the electric currents (I1, I2) which are to be used as input currents, run through the entire voltage range of the input voltage Vi. Because of this, when the input voltage Vi is supplied as a continuous wave such as full wave rectified output, the input current runs continuously, providing a basis for a correction in the power factor.

In addition, if the output terminals 21 and 22 are shorted or overloaded, the energy to be transferred is reduced or cut off by lowering the duty cycle of the first switching element 4 and the second switching element 5, or turning them OFF, achieving protection against over current at the time of output shorting.

Furthermore, since the first switching element 4 and the second switching element 5 are in parallel viewed from the input terminals 11 and 12, even when the first switching element 4 and the second switching element 5 are turned ON at the same time, the electric current is divided while the energy is being transferred, to reduce power loss in the switching elements.

The energy stored in the transformer 3 is discharged via the first diode 6 or the second diode 7, but since current never runs through both of the diodes, power loss through the diodes is reduced.

In addition, since the control circuit 9 supplies the first control signal S1, which has an ON period width that corresponds to the deviation of the output voltage Vo from the target output voltage Vr, to the first switching element 4, the output voltage Vo is made constant without having to monitor both the input voltage Vi and output voltage Vo.

Furthermore, since the control circuit 9 turns ON the second switching element 5 when the first switching element 4 is turned OFF and then turns OFF the second switching element 5 after a specific period of time elapses, the output voltage Vo is made constant with simple control.

FIGS. 3 to 6 show circuit diagrams of other embodiments of the power supply unit according to the present invention. In these figures, reference numbers that are the same as those used in FIG. 1 indicate identical components.

Figure 3:
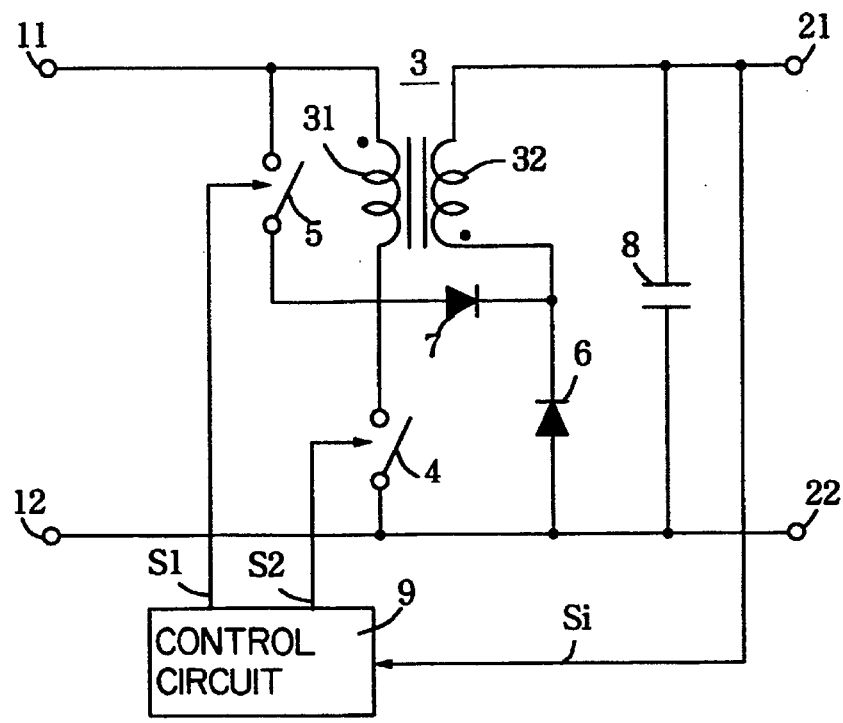
FIG. 3 is a circuit diagram showing another embodiment of the power supply unit according to the present invention.

In the embodiment shown in FIG. 3, the second switching element 5 is connected between the input terminal 11 and the anode of the second diode 7. The second switching element 5 is connected to the input terminals 11 and 12 via the second diode 7, the output winding 32 of the transformer 3 and the output terminals 21 and 22. Other aspects of this embodiment are identical to those in the embodiment shown in FIG. 1.

Figure 4:
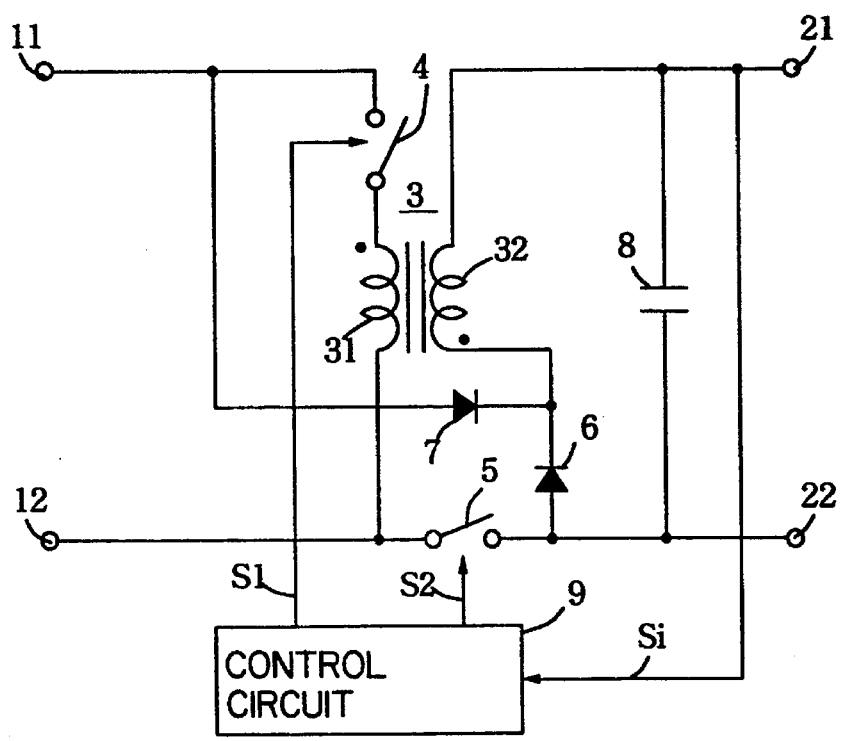
FIG. 4 is a circuit diagram showing yet another embodiment of the power supply unit according to the present invention.

In the embodiment shown in FIG. 4, the first switching element 4 is connected between the input terminal 11 and the input winding 31. Other aspects of this embodiment are identical to those in the embodiment shown in FIG. 1.

Figure 5:
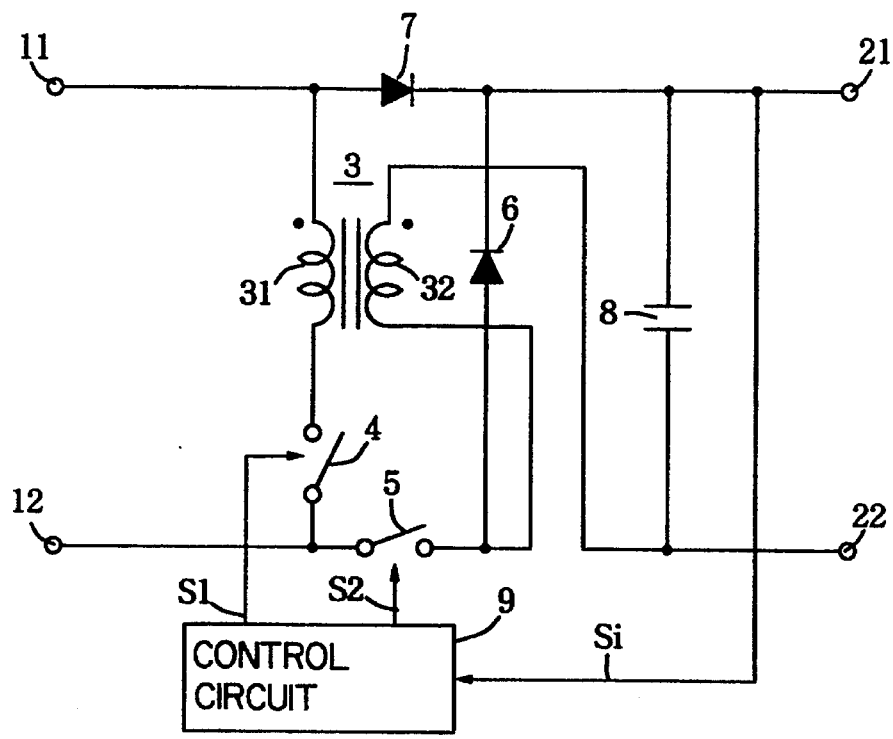
FIG. 5 is a circuit diagram showing yet another embodiment of the power supply unit according to the present invention.

The embodiment shown in FIG. 5 presents a case in which the polarity of the output winding 32 of the transformer 3 is reversed. The terminal of the output winding 32, which generates a voltage with positive polarity (the terminal toward the side with the black dot) is connected to the output terminal 22 and the other terminal is connected to the second switching element 5. The anode of the first diode 6 is connected to the second switching element 5 while its cathode is connected to the output terminal 21. The anode of the second diode 7 is connected to the input terminal 11 while its cathode is connected to the output terminal 21. The terminal of the output winding 32, which has the positive polarity is connected to the cathode of the first diode 6 via the output terminal 22, the load, and the output terminal 21, while its other terminal is connected to the anode of the first diode 6. The polarities of the transformer 3 and the first diode 6 are the same as in the embodiment shown in FIG. 1. In addition, a circuit loop is constituted with the input terminal 11→the second diode 7→the output terminal 21→the load→the output terminal 22→the output winding 32→the second switching element 5→the input terminal 12.

Figure 6:
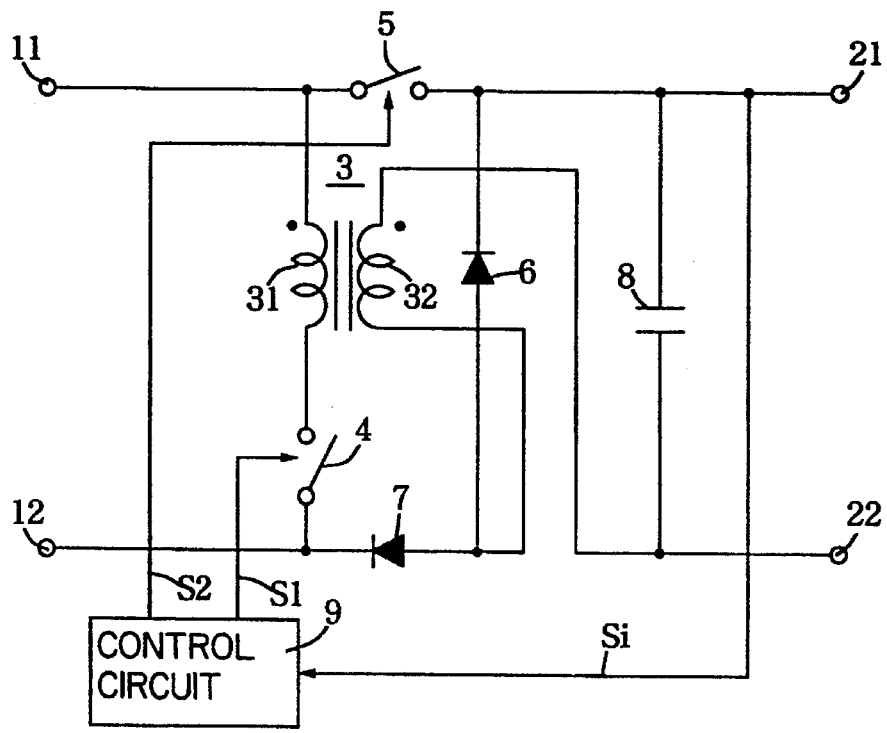
FIG. 6 is a circuit diagram showing yet another embodiment of the power supply unit according to the present invention.

The embodiment shown in FIG. 6 is identical to that shown in FIG. 5 except that the positions of the second switching element 5 and the second diode 7 are reversed, with the anodes of the first diode 6 and the second diode 7 being commonly connected.

In all these embodiments, advantages similar to those in the embodiment shown in FIG. 1 are achieved.

Figure 7:
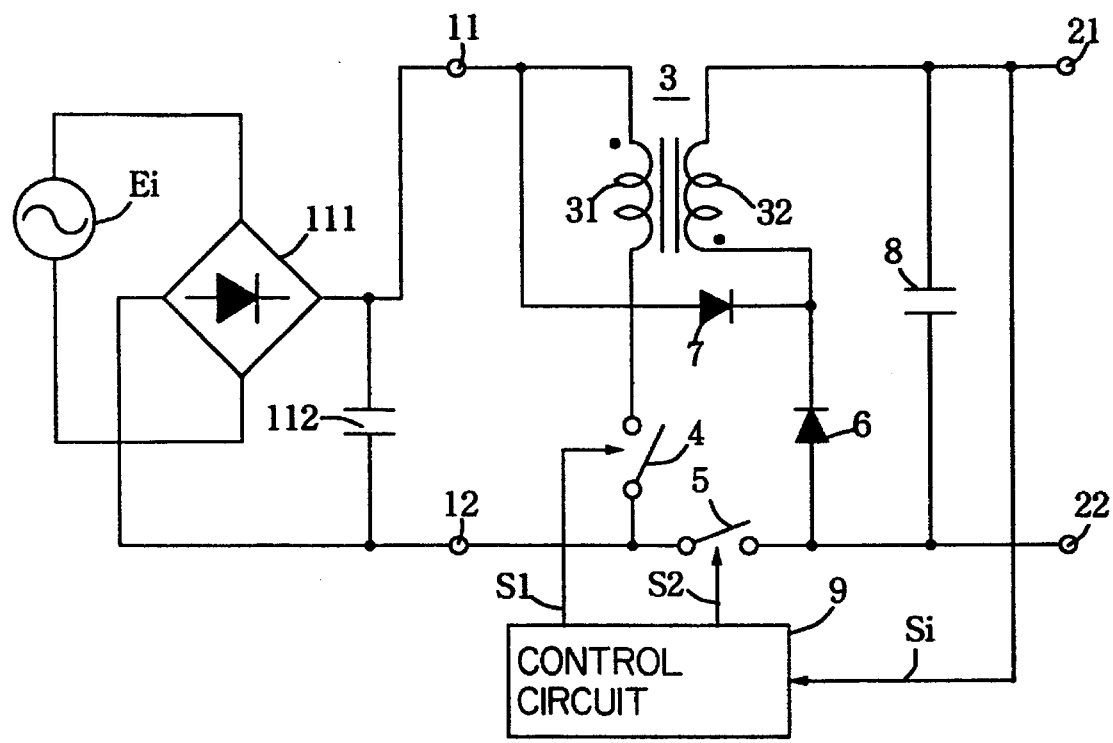
FIG. 7 is a circuit diagram showing yet another embodiment of the power supply unit according to the present invention.

FIG. 7 is a circuit diagram of another embodiment of the power supply unit according to the present invention. In the figure, reference numbers that are the same as those used in FIG. 1 indicate identical components. As shown in the figure, this embodiment is provided with a full wave rectifying circuit 111. The full wave rectifying circuit 111 performs full wave rectification for the AC input Ei and supplies full wave rectified output to the input terminals 11 and 12. Consequently, the input terminals 11 and 12 are supplied with a continuous input voltage and, as explained earlier, the first switching element 4 in the first energy transfer circuit and the second switching element 5 in the second energy transfer circuit are controlled so that an input current runs through a full range of input voltages, providing a basis for a correction in the power factor. A capacitor 112 is a noise filter which absorbs the switching noise that is generated by the switching operation of the first switching element 4 and the second switching element 5. Note that it is not a smoothing capacitor.

Figure 8:
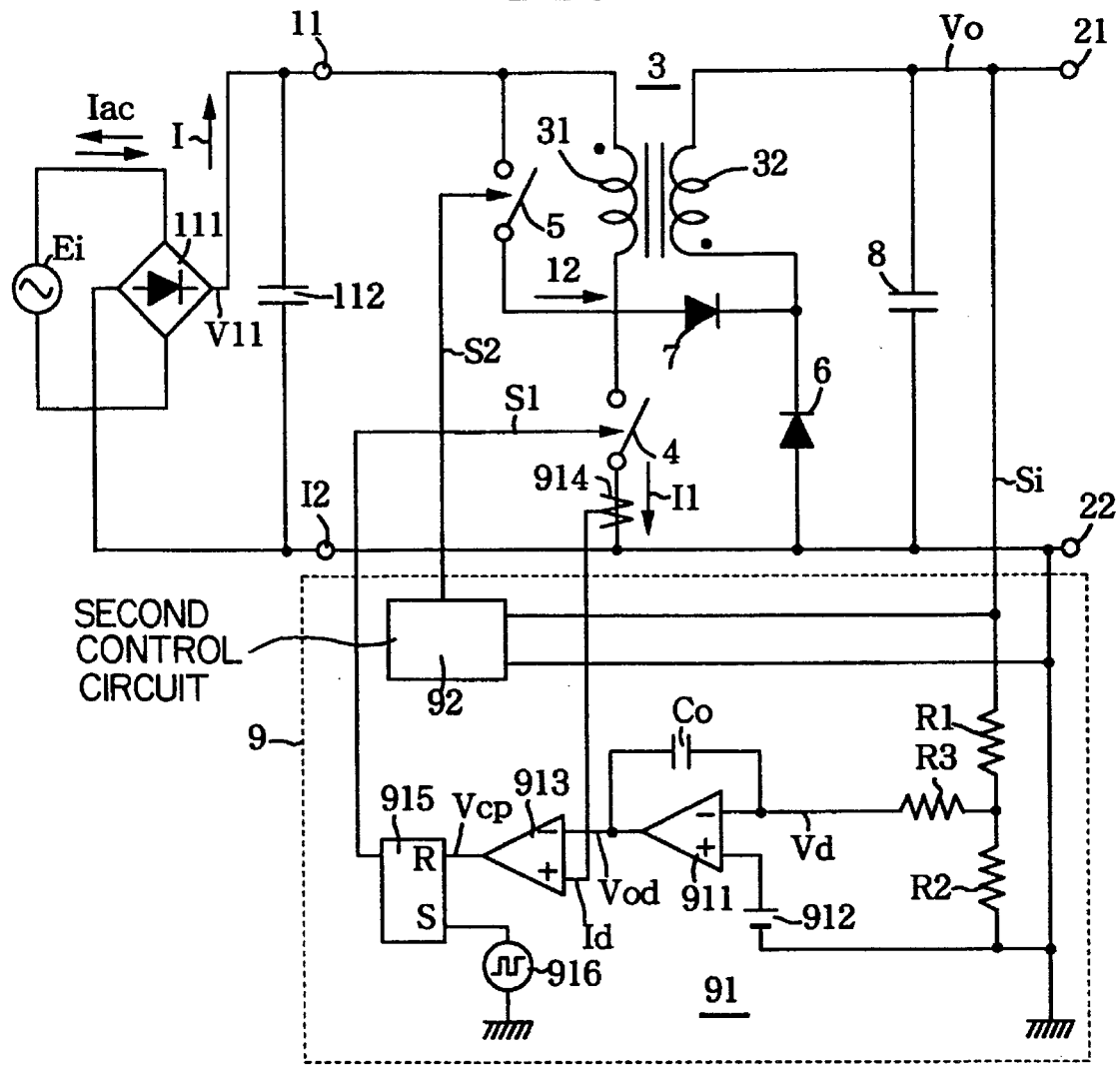
FIG. 8 is a circuit diagram showing yet another embodiment of the power supply unit according to the present invention.

Next, an example of the control circuit 9 which is suitable for a power factor correction is explained in reference to FIG. 8. The detected signal Vd of the output voltage Vo that appears between the output terminals 21 and 22 and the detected signal Id of the electric current I1 running to the first switching element 4 are input to the control circuit 9. In the control circuit 9, the difference between the detected signal Vd and the reference voltage is amplified and the phase of the detected signal Vd of the output voltage Vo is shifted by approximately 90°. Then the signal Vod, after the phase shift, and the detected signal Id of the current I1 are compared, and the first switching element 4 is controlled based upon the compared output signal.

In this embodiment, the output voltage is divided by the resistors R1 and R2 and the divided voltage is supplied to an input terminal (−) of an error amplifier 911 via a resistor R3, as a detected signal Vd. A reference voltage is supplied to an input terminal (+) of the error amplifier 911 by a reference power source 912. The error amplifier 911 is provided with a capacitor Co between its input terminal (−) and its output terminal. This error amplifier 911 operates as an integrator which uses the time constant Co·R3, determined by the capacitor Co and the resistor R3, as an integral time constant to obtain the output Vod, which is obtained by shifting the phase of the determined signal Vd by approximately 90° and by amplification. The output Vod is supplied to an input terminal (−) of a comparator 913 that is provided on the next level. The electric current I1 running to the first switching element 4 is detected by a means for current detection 914. Various types of sensors in the known art may be used for the means for current detection 914. Typically, it will be a current transformer. The detected signal Id obtained at the means for current detection 914 is supplied to an input terminal (+) of the comparator 913. Thus, the comparator 913 compares the signal Vod against the detected signal Id of the current I1 and controls the first switching element 4 based upon the compared output. A flip-flop 915 is inserted between the comparator 913 and the first switching element 4, and, depending upon the presence or absence of the compared output, the control signal S1 for turning ON/OFF the first switching element 4 is supplied to the first switching element 4. After the first switching element is turned OFF, the control signal S2 is supplied to the second switching element 5 which keeps the second switching element ON for a specific length of time. The reference number 916 indicates an oscillator.

Figure 9:
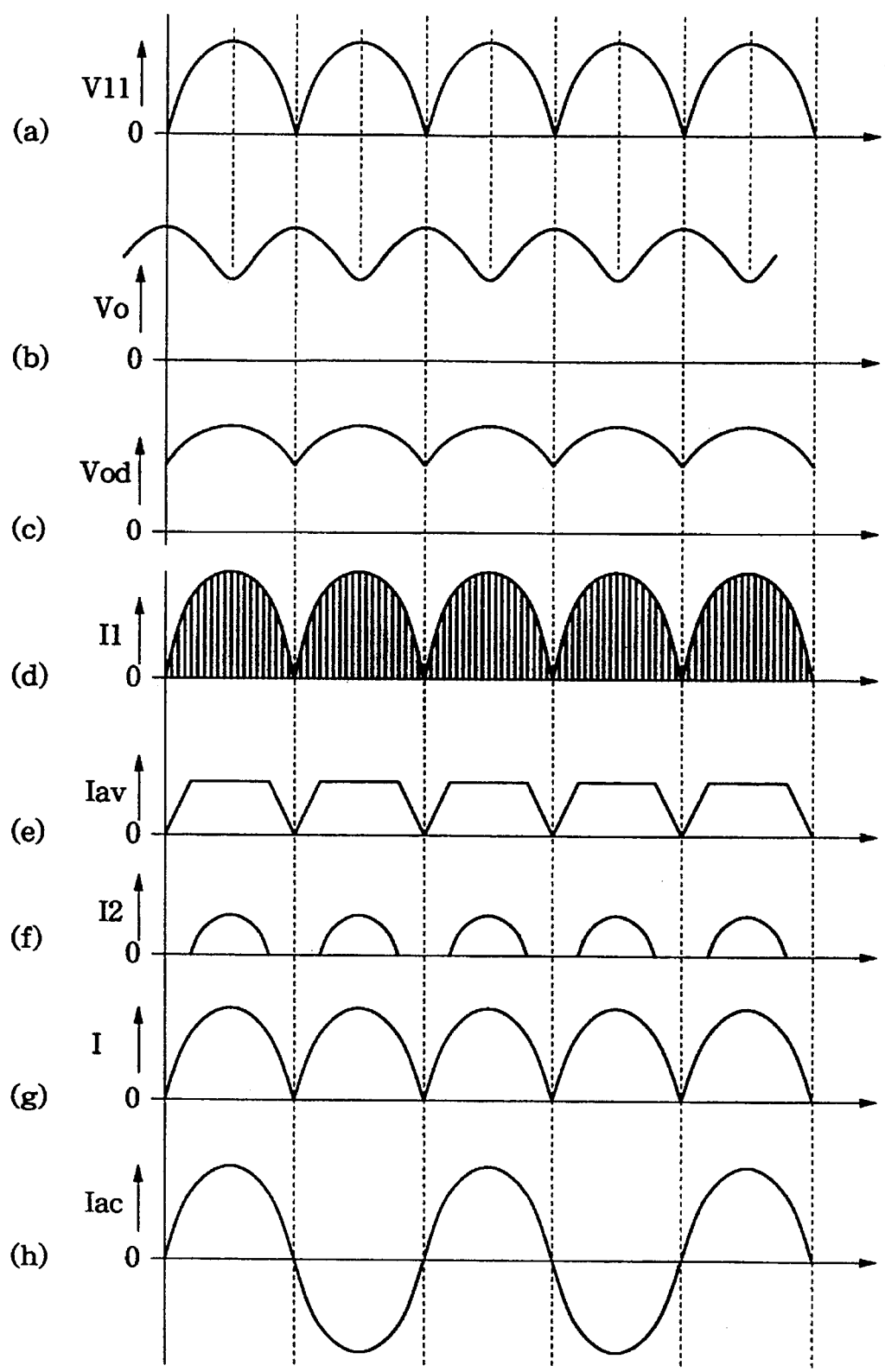
FIG. 9 shows voltage and current waveform diagrams of the various parts of the power supply unit shown in FIG. 8.

Now, the operation of the power supply unit that includes the control circuit 9 shown in FIG. 8 is explained in reference to the waveform diagrams in FIG. 9. FIG. 9(a) shows the waveform of the full wave rectified voltage V11 output from a full wave rectifying diode 111. The full wave rectified voltage V11 is subject to the switching function of the first switching element 4 and the second switching element 5 and is then taken out at the output terminals 21 and 22. FIG. 9(b) shows the waveform of the output voltage Vo viewed at the terminal of the capacitor 8. The output voltage Vo has a phase that is shifted by approximately 90° relative to that of the full wave rectified voltage V11 shown in FIG. 9(a). The output voltage Vo is divided by the resistors R1 and R2 and the divided voltage is supplied to an input terminal (−) of the error amplifier 911 as a detected signal Vd. The error amplifier 911 operates as an integrator which uses the time constant Co·R3 determined by the capacitor Co and the resistor R3 as an integral time constant, as explained earlier. With this, as shown in FIG. 9(c), the output Vod which is determined by amplifying the difference between the detected signal Vd and the reference voltage and by shifting the phase of the detected signal by approximately 90°, is obtained from the error amplifier 911. The output Vod is supplied to an input terminal (−) of the comparator 913 provided on the next stage.

Meanwhile, through the switching operation of the first switching element 4, an electric current I1, shown in FIG. 9(d), is supplied to the circuit loop which includes the first switching element 4 and the winding 31 of the transformer 3. The current I1 running to the first switching element 4 is detected by a means for current detection 914. The detected signal Id obtained at the means for current detection 914, is supplied to an input terminal (+) of the comparator 913. Thus, the comparator 913 compares the signal Vod against the detected signal Id of the current I1 and controls the first switching element 4, based upon the compared output signal. In this embodiment, the output Vcp from the comparator 913 comes to have a logical value of "0" when the detected current signal Id is smaller than the error amplified signal Vod, and its logical value is set to "1" when the detected current signal Id is approximately equal to the amplified error signal Vod. The flip-flop 915 provided between the comparator 913 and the first switching element 4 is reset when the logical value of the compared output Vcp is set to "1" to generate a reset output whose logical value is "0". The flip-flop 915 also generates a set signal with a logical value of "1" when, after the logical value of the compared output Vcp is set to "0", the logical value of the set signal input from the oscillator 916 is set to "1". The reset signal with a logical value of "0" and the set signal with a logical value of "1" in the flip-flop 915 are supplied to the first switching element 4 as the control signal S1.

The first switching element 4 is turned ON when the logical value of the control signal S1 is set to "1" and it is turned OFF when the logical value of the control signal S1 is set to "0".

The timing with which the flip-flop 915 outputs the control signal S2 with a logical value of "0", and as a result, the first switching element 4 is turned OFF, is the timing with which the detected signal Id, detected by the means for current detection 914, becomes approximately equal to the signal Vod output from the error amplifier 911, and the logical value of the output Vcp from the comparator 913 is set to "1". As a result, with the signal Vod output from the error amplifier 911 used as a command value, the first switching element 4 is turned OFF with the timing with which the current I1, running to the first switching element 4, becomes approximately equal to the command value, to cut off the current I1.

When the logical value of the set signal supplied by the oscillator 916 is set to "1" while the detected signal Id, detected by the means for current detection 914 is lower than the signal Vod output from the error amplifier 911, the flip-flop 915 outputs a control signal with a logical value of "1" again, to turn ON the first switching element.

As shown in FIG. 9(c), the signal Vod used here as a command value has the same phase as the full wave rectified V11 shown in FIG. 9(a). With the signal Vod used as a command value, the first switching element 4 is controlled so that it supplies the current I1 in conformance to the command value. As a result, as shown in FIGS. 9(d) and 9(e), the current I1 runs in such a manner that its phase is the same as that of the signal Vod.

The electric current I which runs toward the output side of the full wave rectifying circuit 111 is the sum of the current Iav which runs to the first switching element 4 (FIG. 9(c)) and the current I2 which runs to the second switching element 5 (FIG. 9(f)). The current I2 running to the second switching element 5 is as shown in FIG. 9(f), since the second switching element 5 operates constant ON pulse width. Consequently, the current I which runs toward the output side of the full wave rectifying circuit 111 has the waveform shown in FIG. 9(d) which is obtained by adding the current Iav in FIG. 9(e) to the current I2 shown in FIG. 9(f).

As a result, the current Iac running toward the AC input side of the full wave rectifying circuit 111 is a continuous sine wave as shown in FIG. 9(h). This greatly corrects the power factor.

FIG. 8 shows an embodiment which is structured with the power supply unit shown in FIG. 3 as a basis, the teachings of the embodiment in FIG. 8 apply to the power supply units shown in FIGS. 1, 3, 4, 5, 6 and 7.

Figure 10:
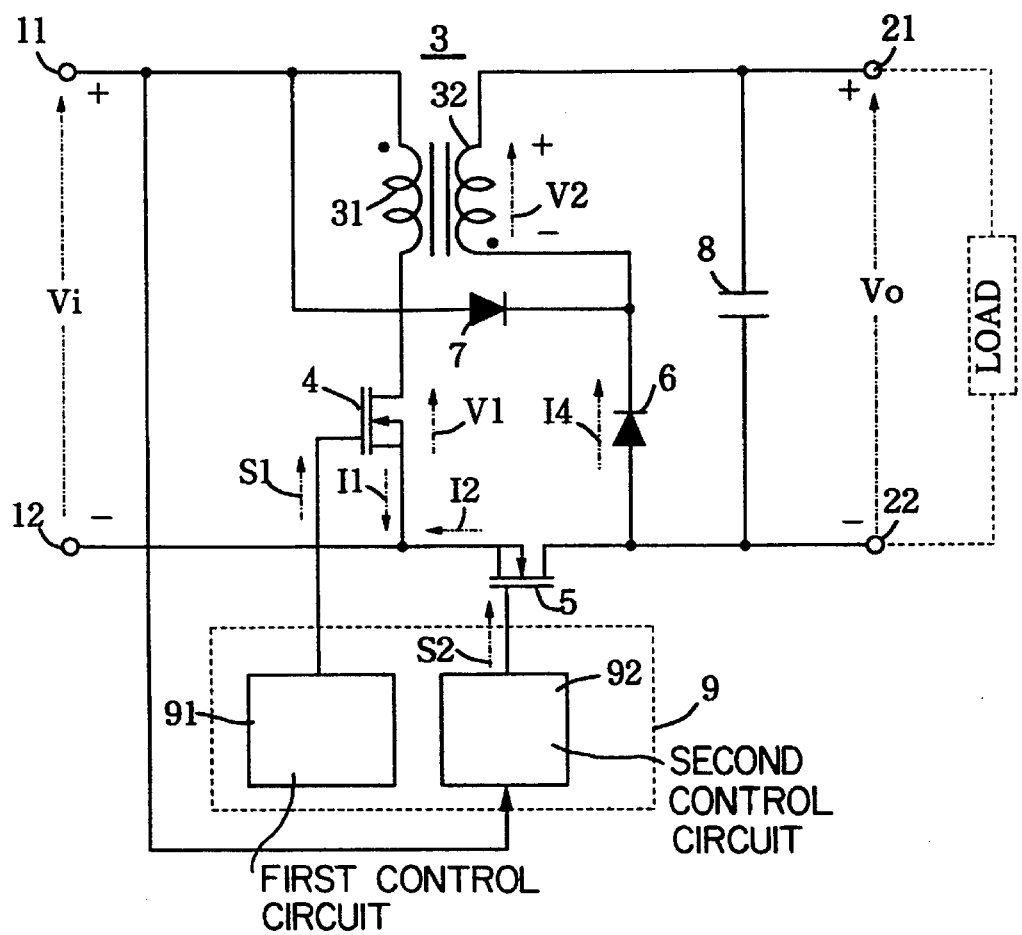
FIG. 10 is a circuit diagram showing yet another embodiment of the power supply unit according to the present invention.

FIG. 10 is an electric circuit diagram of yet another embodiment of the power supply unit according to the present invention. In this embodiment, the control circuit 9 changes the ON pulse width of the second switching element 5 depending upon the size of the input voltage Vi. To achieve this, in the embodiment shown in FIG. 10, the control circuit 9 includes a first control circuit 91 for controlling the first switching element 4 and a second control circuit 92 for controlling the second switching element 5. The second control circuit 92 changes the ON pulse width of the second switching element 5 depending upon the size of the input voltage Vi. The first control circuit 91 may have the circuit structure shown in FIG. 8.

When the ON period of the second switching element 5 is designated Ton and the switching cycle is designated T, Vi·Ton/T=Vo The efficiency is improved by increasing the ON period Ton of the second switching element 5 while the input voltage Vi is lower than the output voltage Vo so that the period of time over which it operates as a boost converter is lengthened. However, as is clearly indicated by the equation above, if the ON period Ton of the second switching element 5 is increased, the output voltage Vo becomes excessively high, making stable output difficult.

Figure 11:
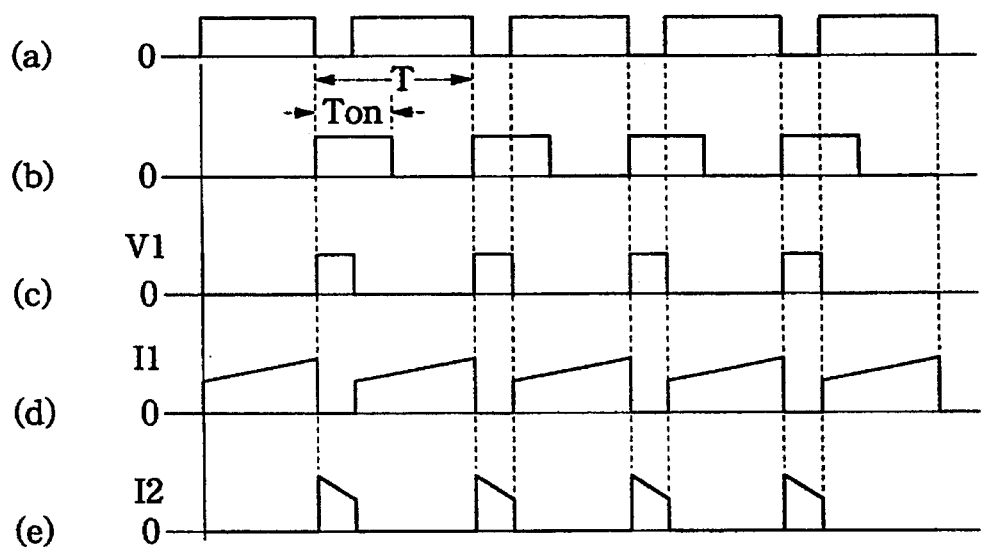
FIG. 11 is a waveform diagram illustrating one control method employed in the power supply unit shown in FIG. 10.

As is obvious from the equation above, the output voltage Vo is determined by (Vi·Ton/T). Thus, when the input voltage Vi is low, the ON period Ton of the second switching element 5 is increased, to lengthen the period of time over which it operates as a boost converter and to improve the efficiency. FIG. 11 shows waveforms obtained when the input voltage Vi is low. FIG. 11(a) shows the switching waveform of the first switching element 4 and FIG. 11(b) shows the switching waveform of the second switching element 5. FIG. 11(c) is the waveform of the voltage which appears between the terminals of the first switching element 4 when the first switching element 4 is turned ON and OFF. FIG. 11(d) is the waveform of the electric current I1 that runs to the first switching element 4 and FIG. 11(e) is the waveform of the electric current I2 that runs to the second switching element 5.

Figure 12:
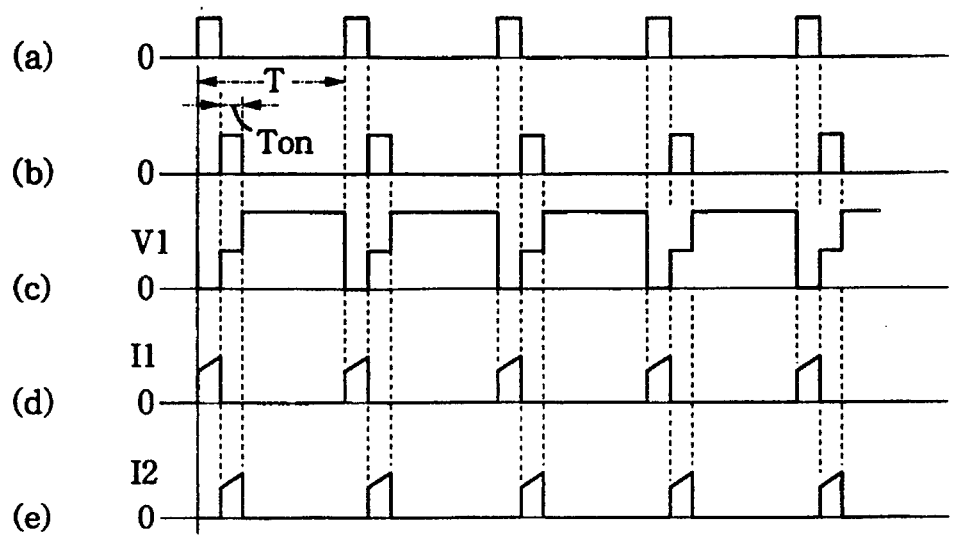
FIG. 12 is a waveform diagram illustrating another control method employed in the power supply unit shown in FIG. 10.

When the input voltage Vi is high, the ON period Ton of the second switching element 5 is reduced to perform control which prevents the output voltage Vo from becoming excessively high. FIG. 12 shows the waveforms obtained when the input voltage Vi is high. FIG. 12a shows the switching waveform of the first switching element 4 and FIG. 12(b) shows the switching waveform of the second switching element 5. FIG. 12(c) is the waveform of the voltage which appears between the terminals of the first switching element 4 when the first switching element 4 is turned ON and OFF. FIG. 12(d) is the waveform of the electric current I1 that runs to the first switching element 4 and FIG. 12(e) is the waveform of the electric current I2 that runs to the second switching element 5.

As is obvious from comparing FIG. 11(b) and FIG. 12(b), when the input voltage Vi is low, the ON period Ton of the second switching element 5 is increased. In contrast, when the input voltage Vi is high, the ON Ton period of the second switching element 5 is reduced. The first control circuit 91 uses the input voltage Vi as an input signal, and is capable of controlling the ON period Ton based upon the input voltage Vi.

As explained earlier, since the input voltage Vi and the output voltage Vo have the relationship Vi·Ton/T=Vo, the control circuit 9 may control the ON period width Ton of the second switching element 5 based upon the size of the output voltage Vo.

While FIG. 10 shows an embodiment which is structured with the power supply unit shown in FIG. 1 as a basis, the teachings of the embodiment in FIG. 10 apply to the power supply units shown in FIGS. 3, 4, 5, 6 and 7.

Figure 13:
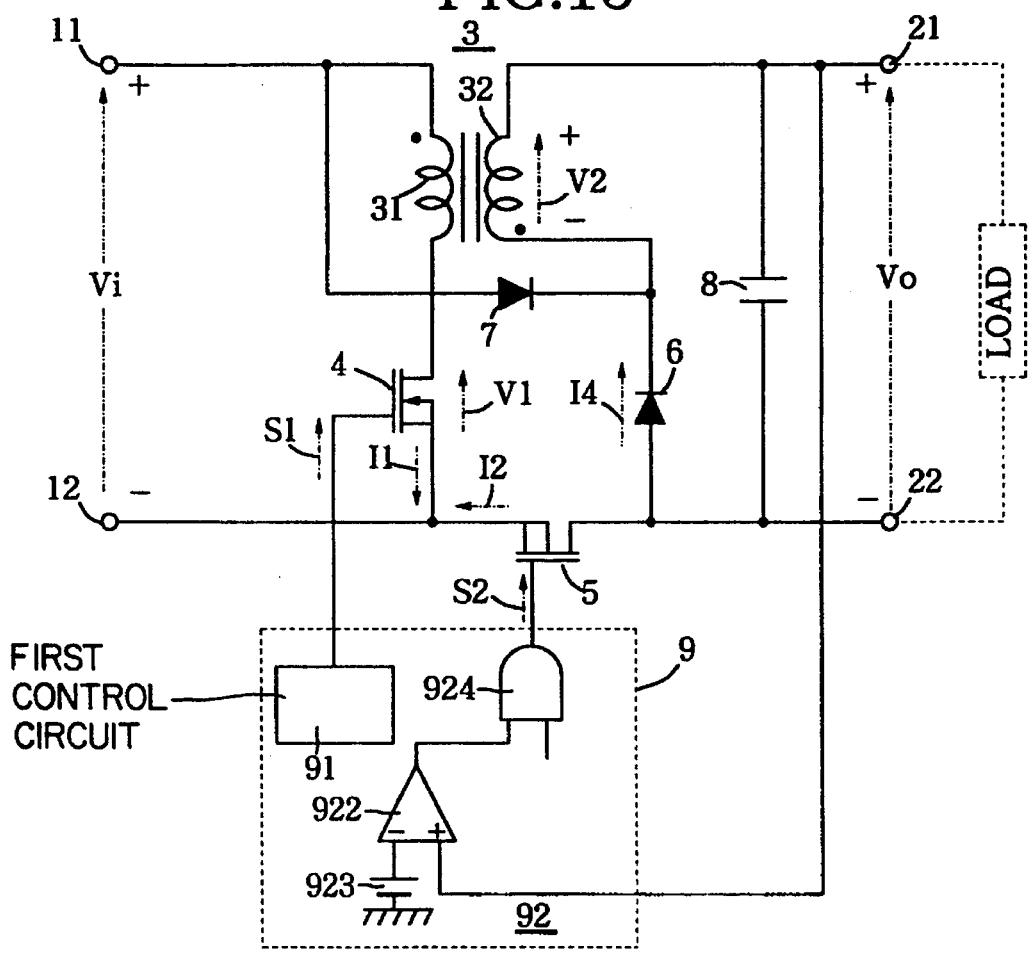
FIG. 13 is a circuit diagram showing yet another embodiment of the power supply unit according to the present invention.

FIG. 13 is an electric circuit diagram of yet another embodiment of the power supply unit according to the present invention. In this embodiment, the operation of the second switching element 5 is prohibited by the control circuit 9 until the output voltage Vo reaches a specific value. While the operation of the power supply unit is stopped, the stored electric charge in the output capacitor 8 is approximately 0. Because of this, if the second switching element 5 is turned ON at the same time as the power supply unit is started up, a high voltage is applied to the transformer 3. This means that a large transformer is required. Since, in the embodiment shown in FIG. 13, the operation of the second switching element 5 is prohibited by the control circuit 9 until the output voltage Vo reaches a specific value, a considerable electric charge has been already stored in the output capacitor 8 when the second switching element 5 is turned ON. Thus, the voltage applied to the transformer 3 at start up is reduced.

The control circuit 9 in this embodiment includes a first control circuit 91 for controlling the first switching element 4 and a second control circuit 92 for controlling the second switching element 5, and the second control circuit 92 prohibits the operation of the second switching element 5 until the output voltage Vo reaches a specific value. The second control circuit 92 compares the voltage signal Si of the output voltage Vo with the reference voltage from the reference voltage source 923 using the comparator 922, and when the voltage signal Si is higher than the reference voltage, it puts out a control signal S2 from an AND gate 924. Until the control signal S2 is output, the operation of the second switching element 5 is prohibited. The first control circuit 91 may have the circuit structure shown in FIG. 8. In addition, while FIG. 13 shows an embodiment which is structured with the power supply unit shown in FIG. 1 as a basis, the teachings of the embodiment in FIG. 13 apply to the power supply units shown in FIGS. 3, 4, 5, 6 and 7.

Figure 14:
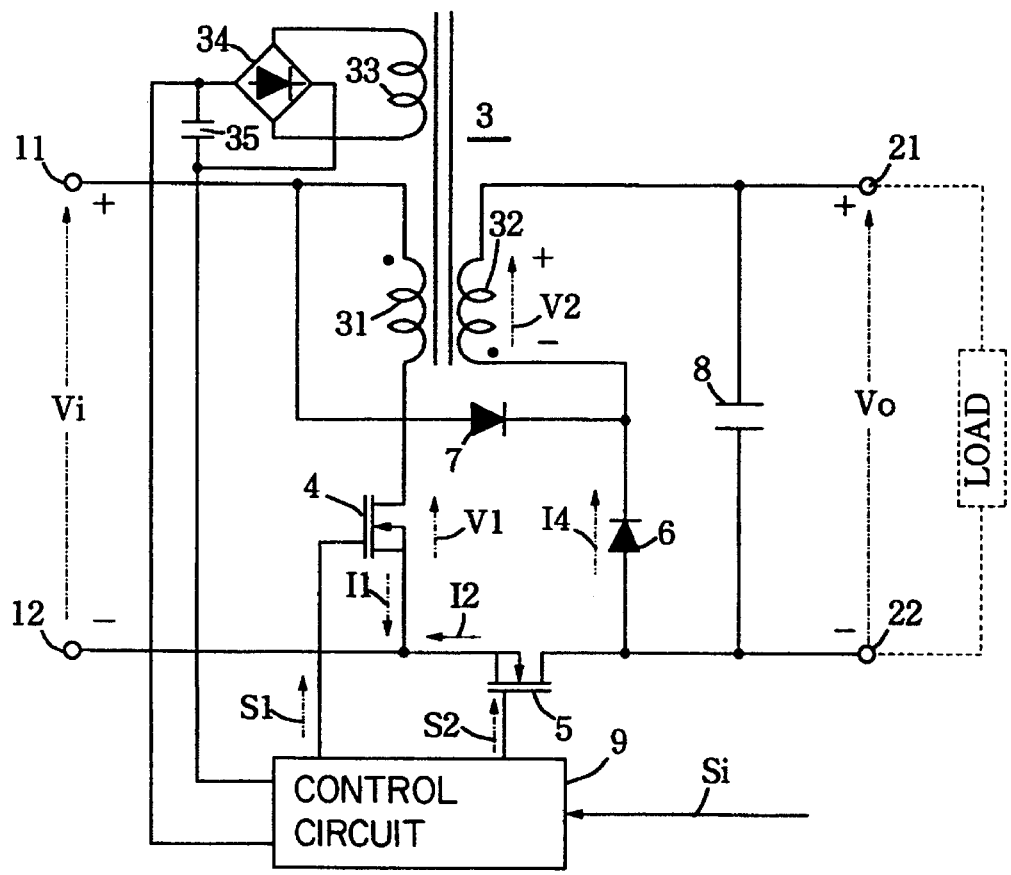
FIG. 14 is a circuit diagram showing yet another embodiment of the power supply unit according to the present invention.

FIG. 14 is an electric circuit diagram of yet another embodiment of the power supply according to the present invention. The control circuit 9 uses the induced voltage generated at a third winding 33, which is wound around the transformer 3, as an auxiliary power supply. With this structure, the power supply unit can be miniaturized. Preferably, the auxiliary power supply circuit should be provided with a full wave rectifying circuit 34 and the full wave rectified output should be smoothed with a capacitor 35. With this auxiliary power supply circuit, stable auxiliary power supply voltage is obtained. Although not shown in the figure, the control circuit may have one of the circuits shown in FIGS. 8, 10 and 13. In addition, While FIG. 14 shows an embodiment which is structured with the power supply unit shown in FIG. 1 as a basis, the teachings of the embodiment in FIG. 14 apply to the power supply units shown in FIGS. 3, 4, 5, 6 and 7.

Now, in the power supply units shown in FIG. 1, FIGS. 3 to 8, FIG. 10, FIG. 13 and FIG. 14, a high voltage V1 is applied to the first switching element 4 immediately before the first switching element 4 is turned ON. This causes a reduction in efficiency since the switching loss increases when the first switching element 4 is turned ON. Moreover, a large charge is stored in the junction capacitance of the first switching element 4 and the speed at which the first switching element 4 is turned ON is slowed down due to this stored charge. In order to solve this problem, the control circuit 9 turns ON the second switching element 5 during two periods; one is immediately after the first switching element is turned OFF and the other is immediately before the first switching element 4 is turned ON.

Figure 15:
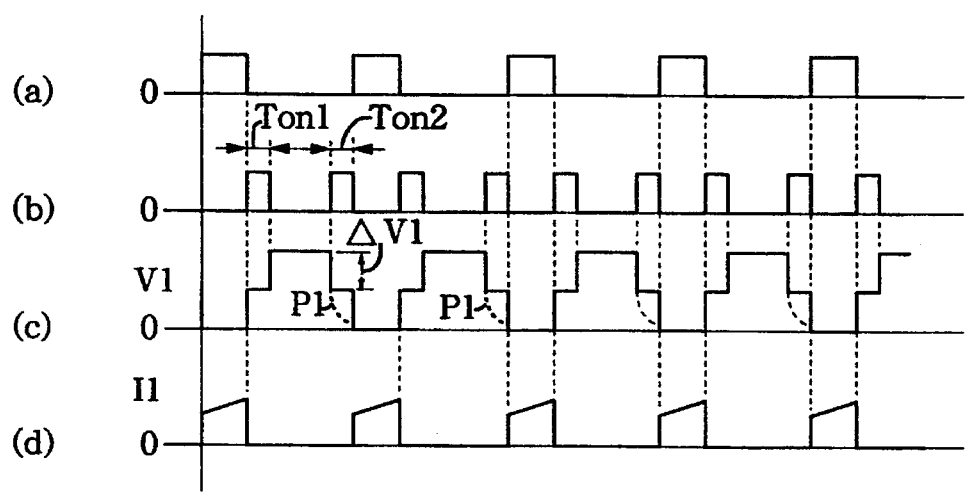
FIG. 15 is a waveform diagram illustrating yet another control method employed in the power supply unit according to me present invention.

FIG. 15 illustrates the relative timing with which the first switching element 4 and the second switching element 5 operate. FIG. 15(a) shows the switching waveform of the first switching element 4 and FIG. 15(b) shows the switching waveform of the second switching element 5. FIG. 15(c) shows the FIG. 12(c) is the waveform of the voltage V1 which is applied to the first switching element 4 and FIG. 15(d) shows is the waveform of the electric current I1 that runs to the first switching element 4.

As is clear from comparing FIG. 15(a) and FIG. 15(b), the second switching element 5 is turned ON during the two periods, i.e., immediately after the first switching element 4 is turned OFF, Ton1, and immediately before the first switching element 4 is turned ON, Ton2. With the second switching element 5 turned ON during the period Ton2 immediately before the first switching element 4 is turned ON, the voltage V1 applied to the first switching element 4 is reduced by V1, as shown in FIG. 15(c).

Due to the leakage inductance at the transformer 3, the voltage V1 becomes reduced along the dotted line P1 in FIG. 15(c). With this, the switching loss of the first switching element 4 is reduced and efficiency is improved.

While the invention has been particularly shown and described with reference to preferred embodiments thereof, it will be understood by those skilled in the art that various changes in form and detail may be made therein without departing from the spirit, scope and teaching of the invention.

What is claimed is:

1. A power supply unit comprising;

a first energy transfer circuit, a second energy transfer circuit and a control circuit, in order to transfer electric power from input terminals to output terminals, wherein;

said first energy transfer circuit includes a transformer and a first switching element, with said first switching element connected in series to an input winding of said transformer and said first energy transfer circuit constitutes a circuit for transferring the energy that stores in said transformer while said first switching element is ON, to said output terminals via an output winding of said transformer during a subsequent OFF period, said second energy transfer circuit includes a second switching element and said output winding of said transformer, with said second switching element and said output winding connected within a circuit loop that runs from one of said input terminals to one of said output terminals and then runs to a load and the other of said output terminals before returning to the other of said input terminals, and said second energy transfer circuit constitutes a circuit for transferring energy from said input terminals to said output terminals via said output winding while said second switching element is ON, and said control circuit controls the timing with which said first switching element and said second switching element are turned ON and the length of time that they remain ON.

2. A power supply unit according to claim 1 wherein;

said first energy transfer circuit includes a first diode and a capacitor, said first diode is connected in series with said output winding while having directionality that runs in the forward direction relative to the voltage generated at said output winding when said first switching element is OFF and the circuit thus connected in series is connected to said pair of output terminals, and said capacitor is connected between said output terminals.

3. A power supply unit according to claim 2 wherein;
said second energy transfer circuit includes a second diode connected within said circuit loop with one end of said second diode connected with one end of said first diode while having the same polarity.

4. A power supply unit according to claim 2 wherein;
said first diode and said output winding constitute an energy discharge circuit in order to discharge the energy stored in said transformer through energy transfer processes performed by said first energy transfer circuit and said second energy transfer circuit.

5. A power supply unit according to claim 1 wherein;
said control circuit performs control so that there is a period during which said second switching element is ON when said first switching element is OFF.

6. A power supply unit according to claim 5 wherein;
said control circuit turns ON said second switching element when said first switching element is turned OFF and then turns OFF said second switching element after a specific period of time elapses.

7. A power supply unit according to claim 1 which is further provided with;
a full wave rectifying circuit that rectifies an AC input voltage and supplies the rectified AC input voltage to said input terminals.

8. A power supply unit according to claim 1 wherein;
said control circuit uses a detected signal of the output voltage appearing between said output terminals and a detected signal of the current running to said first switching element as input signals, shifts the phase of said detected output voltage signal by approximately 90°, compares said detected current signal with the signal after said phase shift and controls said first switching element based upon the compared output signal.

9. A power supply unit according to claim 1 wherein;
said control circuit changes the ON period width of said second switching element depending upon the size of the input voltage.

10. A power supply unit according to claim 1 wherein;
said control circuit changes the ON period width of said second switching element depending upon the size of the output voltage.

11. A power supply unit according to claim 1 wherein;
said control circuit prohibits the operation of said second switching element until the output voltage reaches a specific level.

12. A power supply unit according to claim 1 wherein;
said control circuit uses an induced voltage that is generated at a third winding wound around said transformer as an auxiliary power supply.

13. A power supply unit according to claim 1 wherein;
said control circuit turns ON said second switching element during two periods,
namely, immediately after said first switching element is turned OFF and immediately before said first switching element is turned ON.

* * * * *